United States Patent
Yu et al.

(10) Patent No.: US 12,181,562 B2
(45) Date of Patent: Dec. 31, 2024

(54) METHODS FOR CLASSIFYING OBJECTS IN AUTOMOTIVE-GRADE RADAR SIGNALS

(71) Applicant: Indie Semiconductor, Inc., Aliso Viejo, CA (US)

(72) Inventors: Tao Yu, Somerville, MA (US); Atulya Yellepeddi, Medford, MA (US); Michael Price, Medford, MA (US)

(73) Assignee: Indie Semiconductor, Inc., Aliso Viejo, CA (US)

( * ) Notice: Subject to any disclaimer, the term of this patent is extended or adjusted under 35 U.S.C. 154(b) by 216 days.

(21) Appl. No.: 17/684,022

(22) Filed: Mar. 1, 2022

(65) Prior Publication Data

US 2022/0283288 A1   Sep. 8, 2022

Related U.S. Application Data

(60) Provisional application No. 63/155,508, filed on Mar. 2, 2021.

(51) Int. Cl.
*G01S 13/58* (2006.01)
*G01S 7/35* (2006.01)
*G06N 3/02* (2006.01)

(52) U.S. Cl.
CPC .............. *G01S 13/583* (2013.01); *G01S 7/35* (2013.01); *G06N 3/02* (2013.01)

(58) Field of Classification Search
None
See application file for complete search history.

(56) References Cited

U.S. PATENT DOCUMENTS

| | | |
|---|---|---|
| 2017/0363731 A1 | 12/2017 | Bordes |
| 2018/0348343 A1 | 12/2018 | Achour |
| 2019/0011549 A1 | 1/2019 | Mercuri |
| 2019/0377965 A1* | 12/2019 | Totolos, Jr. ............ G06N 3/045 |
| 2019/0391249 A1* | 12/2019 | Takeuchi .............. G01S 13/536 |

(Continued)

FOREIGN PATENT DOCUMENTS

WO   WO-2022187220 A1   9/2022

OTHER PUBLICATIONS

United States Patent and Trademark Office, International Search Report and Written Opinion for PCT/US2022/018304, May 12, 2022, 12 pages.

(Continued)

*Primary Examiner* — Vladimir Magloire
*Assistant Examiner* — Eric K Hodac
(74) *Attorney, Agent, or Firm* — Schwegman Lundberg & Woessner, P.A.

(57) ABSTRACT

A method includes an operation to collect radar signals reflected from objects in a field of view. A three-dimensional range-angle-velocity cube is formed from the radar signals. The three-dimensional range-angle-velocity cube includes individual bins with radar intensity values characterizing angle and range for a specific velocity. Point-pillar sub-cubes are selected from the three-dimensional range-angle-velocity cube. Each point-pillar sub-cube includes a predefined range surrounding a high energy peak in the range-angle dimensions and an entire range in a velocity vector. The point-pillar sub-cubes are processed to compress, decompress, detect, classify or track objects in the field of view.

17 Claims, 10 Drawing Sheets

(56) References Cited

U.S. PATENT DOCUMENTS

2020/0249315 A1    8/2020   Eshet

OTHER PUBLICATIONS

"European Application Serial No. 22763885.5, Response to Communication pursuant to Rules 161(2) and 162 EPC filed Mar. 4, 2024".
"International Application Serial No. PCT/US2022/018304, International Preliminary Report on Patentability mailed Sep. 14, 2023", 6 pgs.

* cited by examiner

METHODS FOR CLASSIFYING OBJECTS IN AUTOMOTIVE-GRADE RADAR SIGNALS

CROSS-REFERENCE TO RELATED APPLICATIONS

This application claims priority to U.S. Provisional Patent Application Ser. No. 63/155,508, filed Mar. 2, 2021, the contents of which are incorporated by reference. This application is also related to U.S. Provisional Patent Applications No. 63/123,403 entitled, "METHOD, APPARATUS AND RADAR SYSTEMS FOR TRACKING OBJECTS" filed on Dec. 9, 2020, and U.S. Provisional Patent Applications No. 63/143,154 entitled, "METHOD FOR DETECTING OBJECTS IN AUTOMOTIVE-GRADE RADAR SIGNALS" filed on Jan. 29, 2021, both of which are hereby incorporated by reference.

FIELD OF THE DISCLOSURE

The present disclosure relates to techniques for classifying objects in automotive-grade radar signals. More particularly, the disclosure describes using point pillars to better classify objects in a radar scene.

BACKGROUND

An autonomous vehicle (AV) is a vehicle that is configured to navigate roadways based upon sensor signals output by sensors of the AV, wherein the AV navigates the roadways without input from a human. The AV is configured to identify and track objects (such as vehicles, pedestrians, bicyclists, static objects, and so forth) based upon the sensor signals output by the sensors of the AV and perform driving maneuvers (such as accelerating, decelerating, turning, stopping, etc.) based upon the identified and tracked objects.

The use of automation in the driving of road vehicles such as cars and trucks has increased with advances in sensing technologies (e.g., object detection and location tracking), control algorithms, and data structures. By combining various enabling technologies like adaptive cruise control (ACC), lane keeping assistance (LKA), electronic power assist steering (EPAS), adaptive front steering, parking assistance, antilock braking (ABS), traction control, electronic stability control (ESC), blind spot detection, GPS and map databases, vehicle to vehicle communication, and other technologies, it becomes possible to operate a vehicle autonomously (i.e., with little or no intervention by a driver).

In the field of autonomous or quasi-autonomous operation of vehicles such as aircraft, watercraft or land vehicles, in particular automobiles, which may be manned or unmanned, sensing the surrounding of the vehicle as well as tracking objects surrounding the vehicle may be considered to be crucial for sophisticated functionalities. These functionalities may range from driver assistance systems in different stages of autonomy up to full autonomous driving of the vehicle.

In the certain environments, a plurality of different types of sensors for sensing the surroundings of a vehicle are used, such as monoscopic or stereoscopic cameras, light detection and ranging (LiDAR) sensors, and radio detection and ranging (radar) sensors. The different sensor types comprise different characteristics that may be utilized for different tasks.

Embodiments of the present disclosure concern aspects of processing measurement data of radar systems, whereby the computationally heavy fusion of sensor data (e.g., range, angle and velocity) can be mitigated. This is particularly useful, when one parameter array needs to be populated before processing another, such as, range and velocity.

Radar systems typically provide measurement data, in particular range, doppler, and/or angle measurements (azimuth and/or elevation), with high precision in a radial direction. This allows one to accurately measure (radial) distances as well as (radial) velocities in a field of view of the radar system between different reflection points and the (respective) antennae of the radar system.

Radar systems transmit (emit) radar signals into the radar system's field of view, wherein the radar signals are reflected off objects that are present in the radar system's field of view and are received by the radar system. The transmission signals are, for instance, frequency modulated continuous wave (FMCW) signals. Radial distances are measured by utilizing the time-of-travel of the radar signal, while radial velocities are measured utilizing the frequency shift caused by the doppler effect.

By repeating the transmitting and receiving of the radar signals, radar systems can observe the radar system's field of view over time by providing measurement data comprising multiple, consecutive, radar frames.

An individual radar frame may for instance be a range-azimuth-frame or a range-doppler-azimuth-frame. A range-doppler-azimuth-elevation-frame is processed when data in the elevation-direction is available.

In each of the multiple radar frames, a plurality of reflection points that form clouds of reflection points can be detected. However, the reflection points or point clouds in the radar frames do not contain a semantic meaning per se. Accordingly, a semantic segmentation of the radar frames is necessary to evaluate ("understand") the scene of the vehicle's surroundings.

The segmentation of a radar frame means that the single reflection points in the individual radar frames are assigned a meaning. For instance, reflection points may be assigned to the background of the scene, foreground of the scene, stationary objects such as buildings, walls, parking vehicles or parts of a road, and/or moving objects such as other vehicles, cyclists and/or pedestrians in the scene.

Generally, radar systems observe specular reflections of the transmission signals that are emitted from the radar system, since the objects to be sensed tend to comprise smoother reflection characteristics than the (modulated) wavelengths of the transmission signals. Consequently, the obtained radar frames do not contain continuous regions representing single objects, but rather single prominent reflection points (such as the edge of a bumper), distributed over regions of the radar frame.

Radar data form of 3-dimensional, complex-valued array (a.k.a. a radar cube) with dimensions corresponding to azimuth (angle), radial velocity (doppler), and radial distance (range). The magnitude in each angle-doppler-range bin characterizes how much energy the radar sensor sees coming from that point in space (angle and range) for that radial velocity.

The problem in the art arises from the vast volume of energy data populating the cube. This makes processing the data implausible in a real time environment. Solutions presently found in the art include processing one dimension (i.e., parameter) at a time. However, this is not useful for some applications, such as, 3-d cube processing. Furthermore, previous efforts tend to throw away data which can be useful during object classification.

Object classification is typically done on the object list where Doppler information is lost. More rich information is obtained by clustering multiple detections as "objects". "Features" are extracted from the object list and classification is performed on the extracted features. Due to limited bandwidth between the radar unit and the central computer, it has not been feasible to leverage full velocity information for classification tasks.

Thus, there is a need in the art for improved techniques for retaining data during object classification.

SUMMARY OF THE DISCLOSURE

A method includes an operation to collect radar signals reflected from objects in a field of view. A three-dimensional range-angle-velocity cube is formed from the radar signals. The three-dimensional range-angle-velocity cube includes individual bins with radar intensity values characterizing angle and range for a specific velocity. Point-pillar sub-cubes are selected from the three-dimensional range-angle-velocity cube. Each point-pillar sub-cube includes a pre-defined range surrounding a high energy peak in the range-angle dimensions and an entire range in a velocity vector. The point-pillar sub-cubes are processed to compress, decompress, detect, classify and track objects in the field of view.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Similarly, for the purposes of clarity and brevity, not every component may be labeled in every drawing.

For a fuller understanding of the nature and advantages of the present invention, reference is made to the following detailed description of preferred embodiments and in connection with the accompanying drawings, in which.

DETAILED DESCRIPTION

The present disclosure relates to techniques for data compression in automotive-grade radar signals. More particularly, the disclosure describes using point pillars to compress radar cube data while preserving the velocity vector associated with the range-angle space surrounding objects, groups and clusters. The result can then be used in auto-encoding or classification in a radar system and environment.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in view of the drawings.

The present disclosure generally relates to Millimeter Wave Sensing, while other wavelengths and applications are not beyond the scope of the invention. Specifically, the present method pertains to a sensing technology called Frequency Modulated Continuous Waves (FMCW) RADARS, which is very popular in automotive and industrial segments.

Figure 1A:
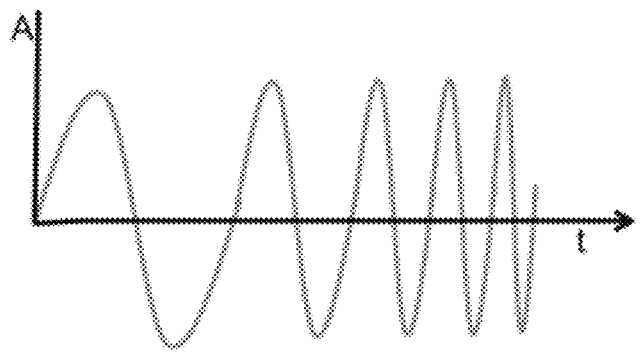
FIGS. 1A and 1B depict an exemplary radar chirp as a function of time, as known in the art.
Figure 1B:
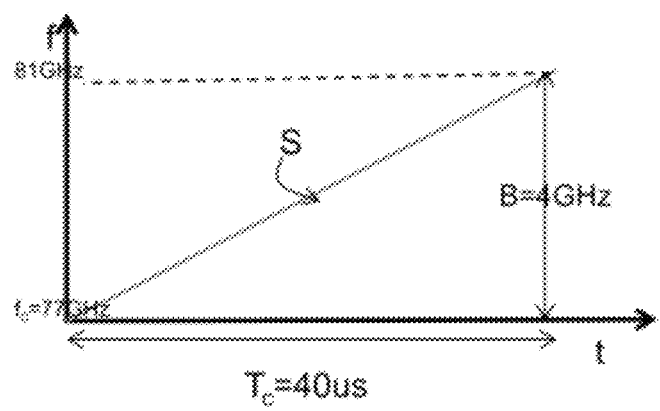

FMCW radar measures the range, velocity, and angle of arrival of objects in front of it. At the heart of an FMCW radar is a signal called a chirp. FIGS. 1A and 1B depict an exemplary radar chirp as a function of time, as known in the art. A chirp is a sinusoid or a sine wave whose frequency increases linearly with time. FIG. 1A shows this as an amplitude versus time, or A-t plot. As shown in FIG. 1B, the chirp starts as a sine wave with a frequency of fc and gradually increase its frequency ending up with a frequency of fc plus B, where B is the bandwidth of the chirp. The frequency of the chirp increases linearly with time. Consequently, in the f-t plot there is a straight line with a slope S. Thus, the chirp is a continuous wave whose frequency is linearly modulated. Hence the term frequency modulated continuous wave or FMCW for short.

Figure 2:
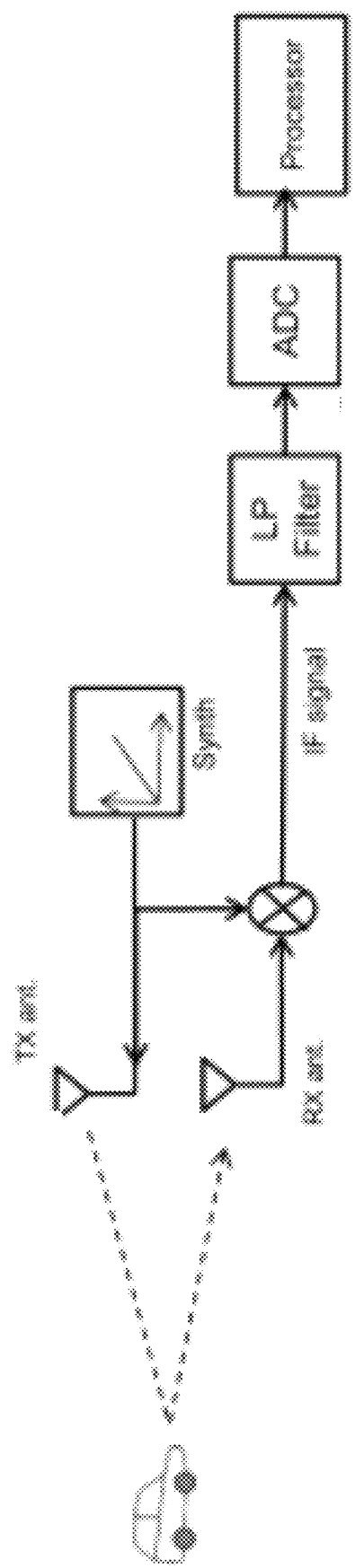
FIG. 2 depicts an exemplary auto-grade radar system, according to some embodiments.

FIG. 2 depicts an exemplary auto-grade radar system, according to some embodiments. It is represented as a simplified block diagram of an FMCW radar with a single TX and a single RX antenna. In one or more embodiments, the radar operates as follows. A synthesizer generates a chirp. This chirp is transmitted by the TX antenna. The chirp is then reflected off an object, such as, a car. The reflected chirp is received at the RX antenna. The RX signal and the TX signal are mixed at a mixer.

The resultant signal is called an intermediate (IF) signal. The IF signal is prepared for signal processing by low-pass (LP) filtering and sampled using an analog to digital converter (ADC). The significance of the mixer will now be described in greater detail.

Figure 3A:
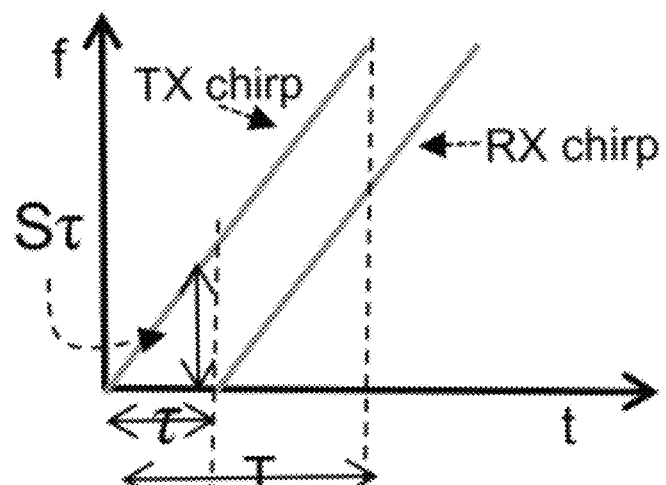
FIGS. 3A and 3B illustrate the frequency difference in exemplary send and receive radar chirps, according to some embodiments.
Figure 3B:
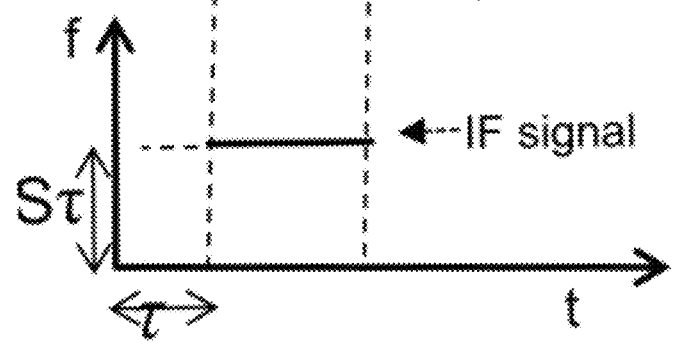

FIGS. 3A and 3B illustrate the frequency difference in exemplary send and receive radar chirps, according to some embodiments. In one or more embodiments, this difference is estimated using a mixer. A mixer has two inputs and one output, as is known in the art. If two sinusoids are input to the two input ports of the mixer, the output of the mixer is also a sinusoid.

The instantaneous frequency of the output equals the difference of the instantaneous frequencies of the two input sinusoids. So, the frequency of the output at any point in time is equal to the difference of the input frequencies of two time-varying sinusoids at that point in time. Tau, τ, represents the round-trip delay from the radar to the object and back in time. It can also be expressed as twice the distance to the object divided by the speed of light. A single object in front of the radar produces an IF signal with a constant frequency given by S2d/c.

Figure 4:
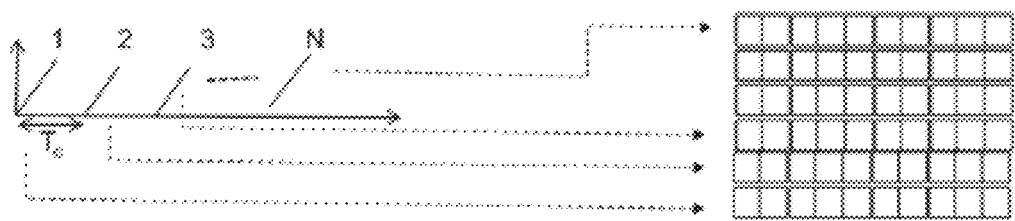
FIG. 4 illustrates an exemplary two-dimensional range array being populated, according to some embodiments.

FIG. 4 illustrates an exemplary two range matrix being populated by a radar frame, according to some embodiments. A radar frame (left) has a time $T_F$ and comprises a plurality of chirps, 1-N, each separated in time by $T_C$.

Each row corresponds to one chirp. That is, for every chirp there is a row in the chirp index, i.e., N rows for N chirps. Each box in a particular row represents one ADC sample. Accordingly, if each chirp is sample M times, there will be M columns in the matrix. The transformation of the data matrix in range and velocity matrices will now be described. The described case with range measurement corresponding to the fast time axis and Doppler to the slow time axis applies to a chirp sequence with chirps with the same starting frequency and length. Other chirp sequences, such as with increasing starting frequencies provide a fast time axis corresponding to coarse range and a slow time axis corresponding to fine range resolution and Doppler. The disclosed techniques can be applied on different chirp sequences and the resulting fast time and slow time diagrams. For simplicity, the following explanations use range for the fast time axis and Doppler for the slow time axis, but the disclosed techniques can be applied to any fast time and slow time representation.

Figure 5A:
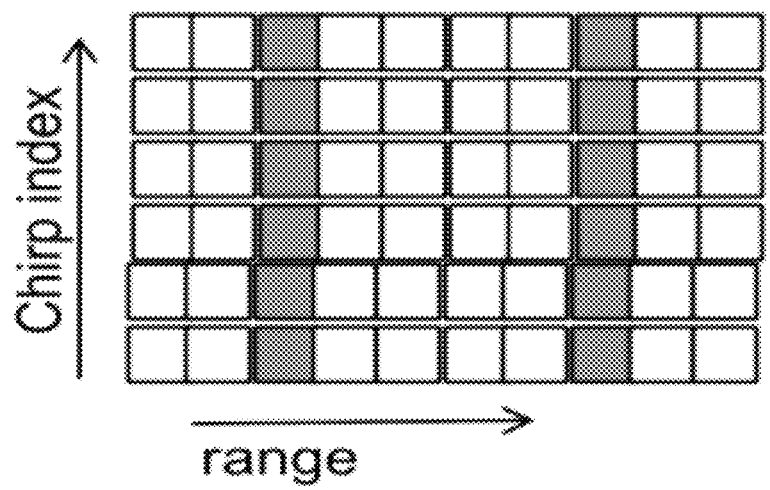
FIGS. 5A and 5B illustrate the creation of a velocity-range array from a chirp index-range array, according to some embodiments.

FIG. 5A illustrates the creation of a chirp-range matrix from the previous data matrix, according to some embodiments. As mentioned above, each row corresponds to samples from a specific chirp. To determine range(s), a range-FFT is performed on each row. A fast Fourier transform (FFT) is an algorithm that computes the discrete Fourier transform (DFT) of a sequence, or its inverse (IDFT). Fourier analysis converts a signal from its original domain (often time or space) to a representation in the frequency domain and vice versa.

The application of the range-FFT resolves objects in range. The x-axis is the frequency corresponding to the range FFT bins. But, since range is proportional to the IF frequency, this can be plotted directly as the range axis. Therefore, FIG. 5A is a matrix of chirps with each chirp having an array of frequency bins. Pursuant to the discussion above, these bins correspond directly to the range via the IF.

Figure 5B:
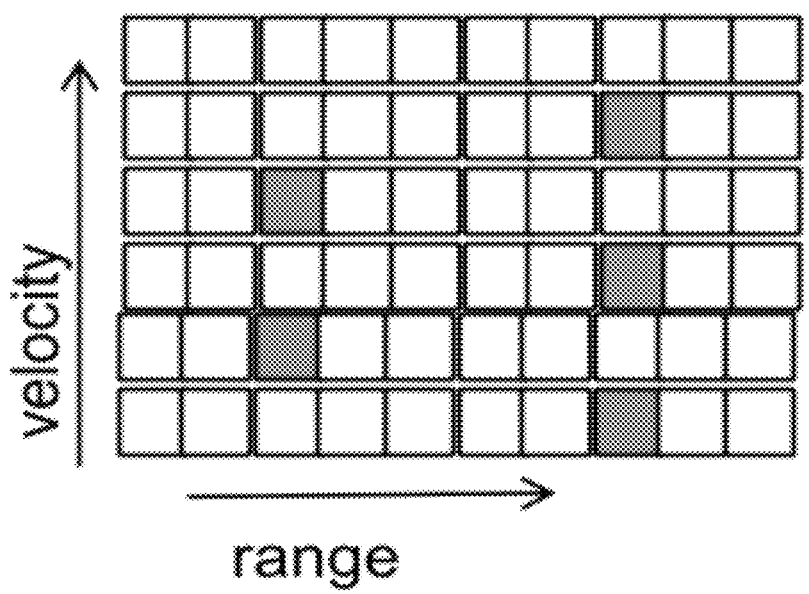

FIG. 5B illustrates the creation of a velocity-range matrix from the previous chirp index-range matrix, according to some embodiments. A Doppler-FFT is performed along the columns of these range-FFT results shown in FIG. 5A. This resolves objects in the velocity dimension.

FIG. 5B depicts two objects in the third range bin traveling at two different speeds. Similar, there are three objects in the eighth range bin traveling at three different speed. It should be noted that these are accurate for a fixed range-angle. Angle determination will now be discussed in greater detail.

Figure 6:
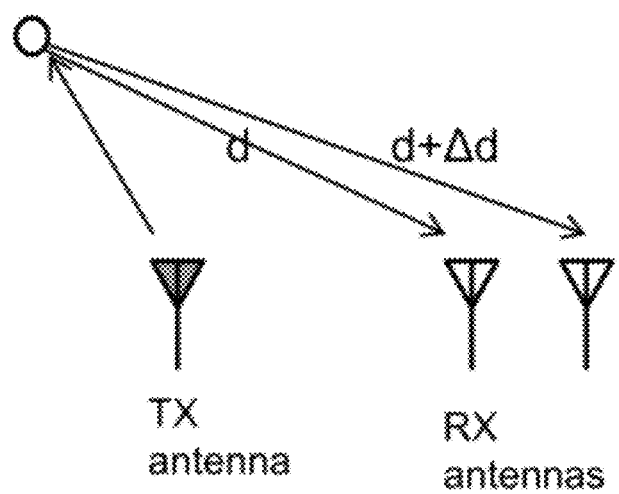
FIG. 6 depicts an exemplary antenna array used to calculate angle, according to some embodiments.

FIG. 6 depicts an exemplary antenna array used to calculate angle, according to some embodiments. Angle estimation requires at least 2 receiver (RX) antennas. The differential distance of the object to each of these antennas is exploited to estimate distance. The transmit (TX) antenna transmits a signal that is a chirp. It is reflected off the object with one ray going from the object to the first RX antenna and another ray going from the object to the second RX antenna.

In this example depicted in FIG. 6, the ray to the second RX antenna has to travel a little longer. That is, an additional distance of delta d. This additional distance results in an additional phase of omega equal to 2 pi delta d by lambda. So, this is the phase difference between the signal at this antenna and the signal at this antenna.

Figure 7:
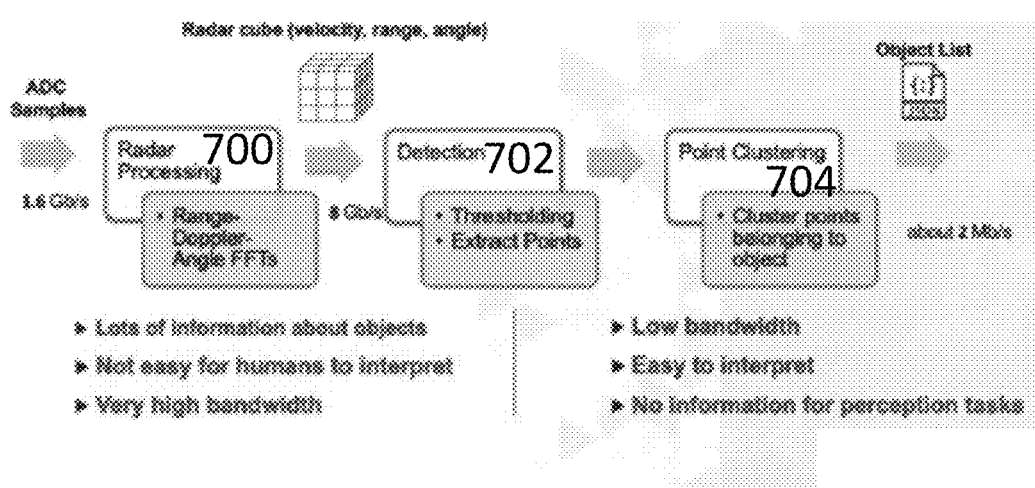
FIG. 7 demonstrates a processing method chain in an exemplary prior art radar system.

FIG. 7 demonstrates a processing method chain in an exemplary radar system, according to some embodiments. Radar processing 700 begins with sampling the radar data. This is typically in response to the transmitted chirps. Analog to digital conversion (ADC) samples arrive at 1.6 Gb/s, in one or more embodiments.

Once the samples have been organized, a three-dimensional FFT is performed on range, angle and velocity. The result is a 3-d radar cube. The radar cube comprises radar intensity as a function of range, angle and velocity. In some embodiments, radar intensity is the energy associated with that time-space location. In another embodiment, radar intensity can also comprise phase information in addition to or separately from amplitude information. The cube is segmented in bins. So, each bin contains a radar intensity value.

During the detection step 702, a set of points or point clouds are generated 704. From these, a threshold value can be determined. In other embodiments, the threshold value is already predetermined. In either case, the state of the art applies the threshold such that any intensities below this value are discarded. This in known in the art as the background. However, the inventors of the present disclosure recognize that some of this background can contain useful information used in object identification and classification.

One advantage of the disclosed techniques is capturing just enough background data to usefully perform object classification while at the same time not processing too much data. In one or more embodiments, some of the low intensity areas are preserved which surround high intensity areas. This is comprised by point clustering step, the present embodiment, which will now be discussed in greater detail.

Figure 8:
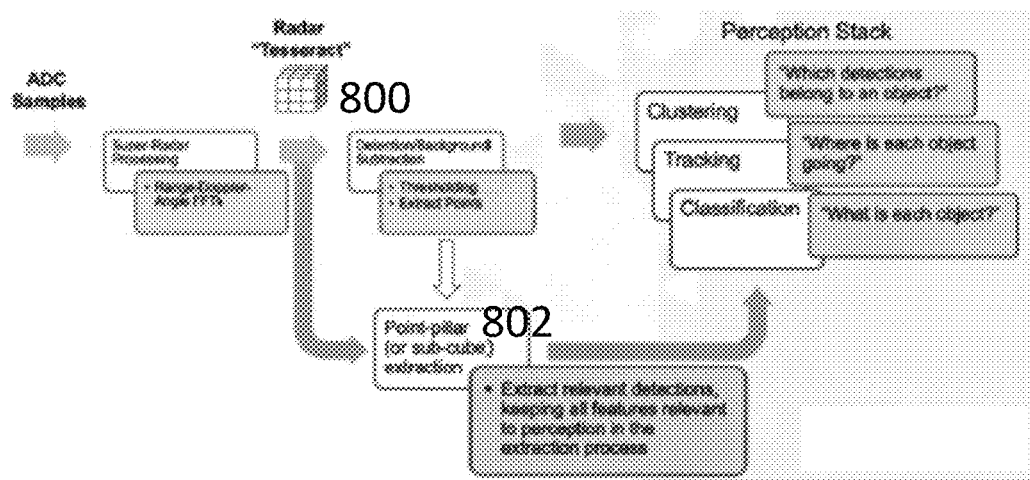
FIG. 8 demonstrates a processing method chain in an exemplary radar system, according to an embodiment of the invention.

FIG. 8 demonstrates a processing method chain in an exemplary radar system, according to some embodiments. In the present embodiment, the background subtraction through some type of thresholding is still performed similarly to the previous embodiment. Points are extracted from the intensities which remain. However, the radar cube is preserved. More particularly, ADC samples are subject to Range-Doppler-Angle FFTs to produce a radar cube 800.

Point-pillars can then be extracted 802 where they can be used to extract relevant detections while keeping all features which are relevant to perception in the extraction process. The point-pillars are subject to clustering (points are clustered into common objects), tracking (object trajectory) and classification (apply semantic label to object).

Figure 9:
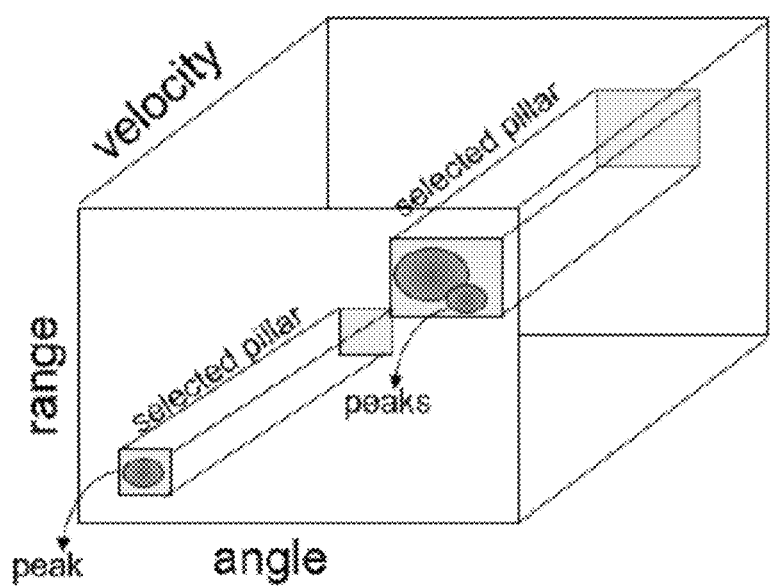
FIG. 9 depicts an exemplary sub-cube in a range-angle-velocity radar cube, according to some embodiments.

FIG. 9 depicts an exemplary range-angle-velocity radar cube, according to some embodiments. As can be appreciated by one skilled in art, the assembly of the matrices result in a 3D radar cube with axes of range-angle-velocity. Methods disclosed herein describe techniques for processing and interpreting radar data extracted from one (or more) 77-GHz DigiMMIC (FMCW) radar sensors mounted on a moving vehicle, although other frequencies and applications are not beyond the scope of the present disclosure.

The radar cube data is in the form of 3-dimensional, complex-valued array with dimensions corresponding to azimuth (angle), radial velocity (doppler), and radial distance (range). Magnitude in each angle-doppler-range bin is taken to describe how much energy the radar sensor sees coming from that point in space (angle and range) for that radial velocity. For demonstrative purposes, linear antenna arrays oriented parallel to the ground are assumed.

Radar cubes comprise large amounts of raw data, usually on the order of many megabytes (MB). This presents a computational challenge for a classifier. It is assumed that some type of detection and foreground extraction have already been performed on the radar cube.

Foreground extraction can be performed by various methods for suppressing noise and artifacts and extracting salient regions of a radar cube. Most, if not all, involve estimating either a background model and somehow removing it or creating a mask that emphasizes desired bins and suppresses others through element-wise multiplication.

Constant False Alarm Rate (CFAR) thresholding is probably the most well-known and well-studied technique and involves estimating a background model through local averaging. Constant false alarm rate (CFAR) detection refers to a common form of adaptive algorithm used in radar systems to detect target returns against a background of noise, clutter and interference.

The primary idea is that noise statistics may be non-uniform across the array. CA-CFAR (cell averaging) computes a moving mean while excluding a region at the center of the averaging window (guard cells) to avoid including a desired object in the background estimate. OS-CFAR (order-statistic) does the same computation but with a percentile operation instead of a mean. Given the background model (estimate of background value in each bin) $b_{ijk}$, the foreground can be estimated as:

$$\forall i,j,k, \; x_{i,j,k} \leftarrow x_{ijk} \odot (x_{ijk} \geq \alpha \cdot b_{ijk}) \quad (1)$$

In some embodiments CFAR is used for detection; however, other schemes, such as, cell averaging (CA-CFAR), greatest-of CFAR (GO-CFAR) and least-of CFAR (LO-CFAR) or other suitable means may be utilized.

In one or more embodiments, micro-Doppler is used in classification. However, in traditional peak detection, some of the low energy surrounding area are lost to background masking. Instead, the inventors of the present disclosure propose retaining the areas adjacent to the peaks, as these are useful in classification. Specifically, most or all velocities (entire range) are selected for any range-angle bin that contains a peak (and its neighbors).

Velocity signatures are characteristic patterns of an object. For example, a tire moving orthogonally to a radar array has a deterministic velocity signature. The center has little doppler velocity, as it moves tangentially; yet the annulus exhibits a distinct array of velocities. Velocity signatures can be used to identify an object by pattern matching these velocities with those predetermined, or they may be learned by a neural network.

Returning to FIG. 9, the point-pillars are selected as sub-cubes. Sub-cubes are selected to sufficiently surround the high energy peaks in the range-angle dimensions, while selecting the entire range in the velocity vector. The result is a sub-cube, or cuboid, point-pillar. While the present embodiment is a parallelepiped point-pillar, any 3-d shape may be used. Furthermore, this same method can be applied to radar cubes which have 4 or more dimensions. Similarly, the entire velocity array may be utilized to provide for accurate classification of objects.

Figure 10:
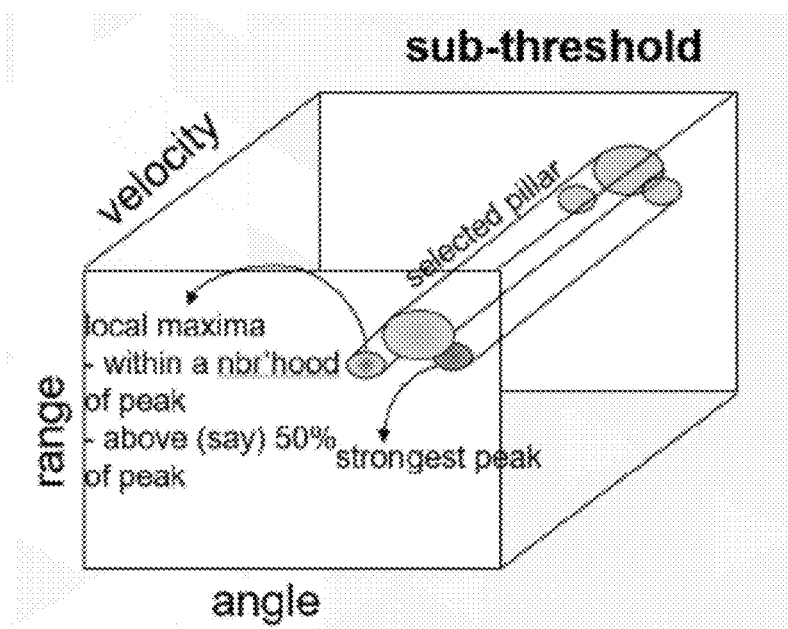
FIG. 10 depicts selecting point-pillars using sub-thresholds in a range-angle-velocity radar cube, according to some embodiments.

FIG. 10 depicts selecting point-pillars using sub-thresholds in a range-angle-velocity radar cube, according to some embodiments. Like the previous embodiment, it assumed that some type of detection and foreground extraction have already been performed on the radar cube. In the present embodiment, sub-threshold point-pillars are used to select pillars.

Sub-thresholding is determined and performed in the following manner Strongest intensity peaks are identified. These can be identified using any of the previously mentioned extraction methods or any other suitable detection technique. Within the range-angle space, other local maxima can then be identified within a predetermined neighborhood. In some embodiments, the neighborhood can be a constant distance from the strongest peak. Whereas, in other embodiments, more complex functions, e.g., Gaussian, can be used to determine whether a local maximum is a part of the strongest peak's neighborhood.

In one or more embodiments, the sub-threshold is a percentage, e.g., 50%, of the intensity of the strongest peak. In other embodiments, the subthreshold is a function of the distance from the strongest peak and/or predetermined parameters. For example, the sub-threshold could also be a function of multiplicative inverse or $e^{-x}$ with boundary conditions. Once a sub-threshold is applied, peaks are clustered together forming the sub-threshold point pillar.

Turning to FIG. 10, it can be appreciated that the sub-threshold point pillar comprises the union of the range-angle of the strongest peak with a contiguous local maximum and a disparate neighbor exhibiting an intensity above the sub-threshold. The entire velocity vector associated with the point-pillar is preserved and used later in classification.

Sub-threshold and sub-cube point-pillar selection are not mutually exclusive. They can be combined. They may also be supplemented with any other suitable pillar section method. Additionally, range-angle shapes can be somewhat arbitrary, as any 2-d form with the corresponding velocities is not beyond the scope of the present disclosure.

Figure 11:
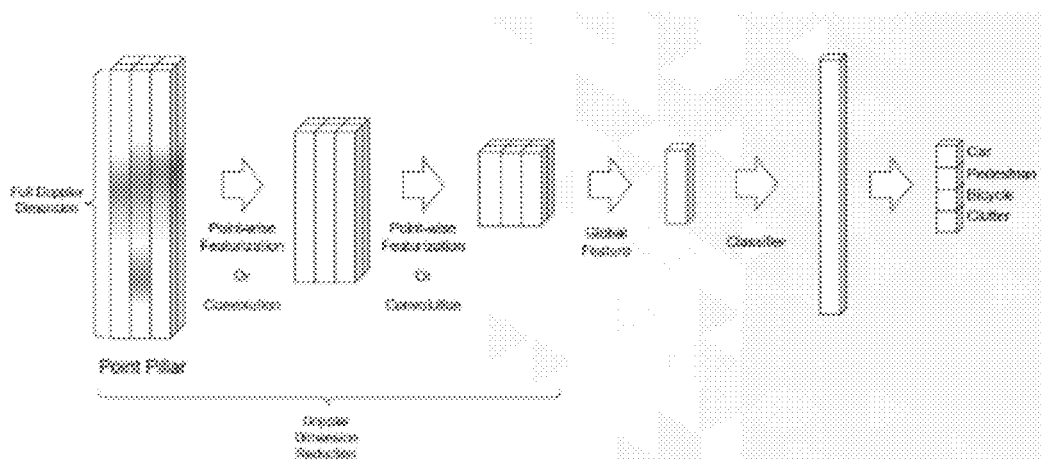
FIG. 11 is an exemplary method for point-pillar based classification in automotive-grade radar, according to some embodiments.

FIG. 11 is an exemplary pipeline for point-pillar based classification in automotive-grade radar, according to some embodiments. Despite the large reduction in data attributed to extracting a point-pillar from a radar cube, the remaining data can still be unwieldy as it usually contains the entire velocity vector for each point-pillar. The first use of unwieldy point-pillars is their application to classify an object directly.

This application recognizes the velocity vectors tend to be sparsely populated. Accordingly, the velocity data can be reduced by the application of a pointwise operator. Pointwise is used to indicate that each value $f(x)$ is subject to some function $f$. Pointwise operations apply operations to function values separately for each point.

In the present embodiment, this is called pointwise featurization. In other embodiments, the reduction can be achieved convolutionally, as in a neural network, for example. In deep learning, a convolutional neural network (CNN, or ConvNet) is a class of deep neural networks, most commonly applied to analyzing visual imagery. They are also known as shift invariant or space invariant artificial neural networks (SIANN), based on their shared-weights architecture and translation invariance characteristics.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

The result is a dramatic reduction in point-pillars size. In the present embodiment, two compression layers are applied. Of course, any number of layers may be used. A further reduction can be achieved by applying global featurization which is inputted into a classifier. This enables the classifier to more easily identify what type of object the radar is looking at, such as, a car, a pedestrian, a bike, or just clutter.

In some embodiments, pointwise operators can be applied to each range-angle bin. While in other embodiments, it can be a convolutional featurization, which is a convolutional kernel applied over a plurality of range, angle and doppler bins. The significance of dimensional reduction is that meaningful data is preserved for classification.

Figure 12:
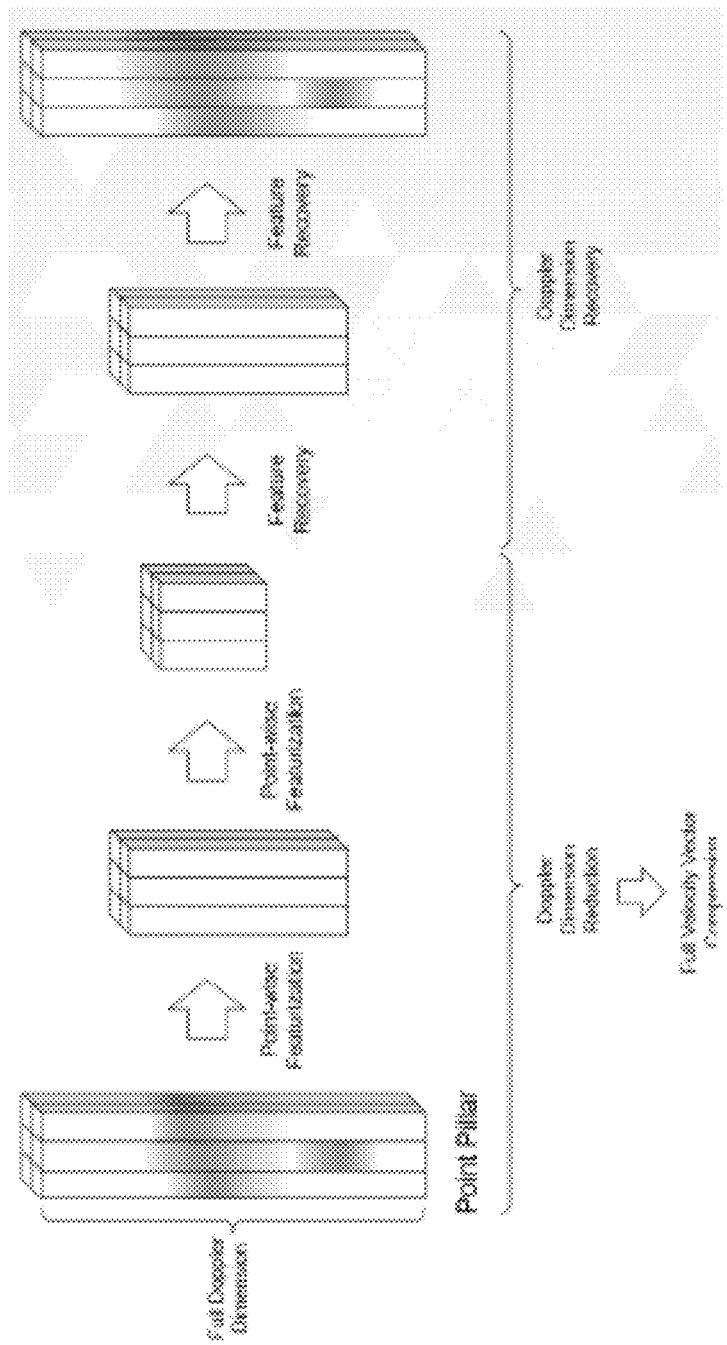
FIG. 12 is an exemplary method for point-pillar based auto-encoding in automotive-grade radar, according to some embodiments.

The inventors of the present disclosure have discovered that some of interpretability of the data can be lost at the classification state. Consequently, a pipeline recovers features thereby giving rise to the reconstruction of the uncompressed point-pillar sub-cubes. FIG. 12 is an exemplary pipeline for point-pillar based auto-encoding in automotive-grade radar, according to some embodiments.

In the present embodiment, full velocity vector compression comprises doppler dimensional reduction by applying two layers of pointwise featurization. The latter portion of the pipeline recovers the doppler dimension by applying two layers of feature recovery. This point-pillar based Autoencoding is useful compressing for transmission to a central classifier while preserving fidelity such that interpretability is maximized.

In some embodiments, the data in point-pillars are compressed and sent over a bus to another computational structure which performs the actual classification.

Figure 13:
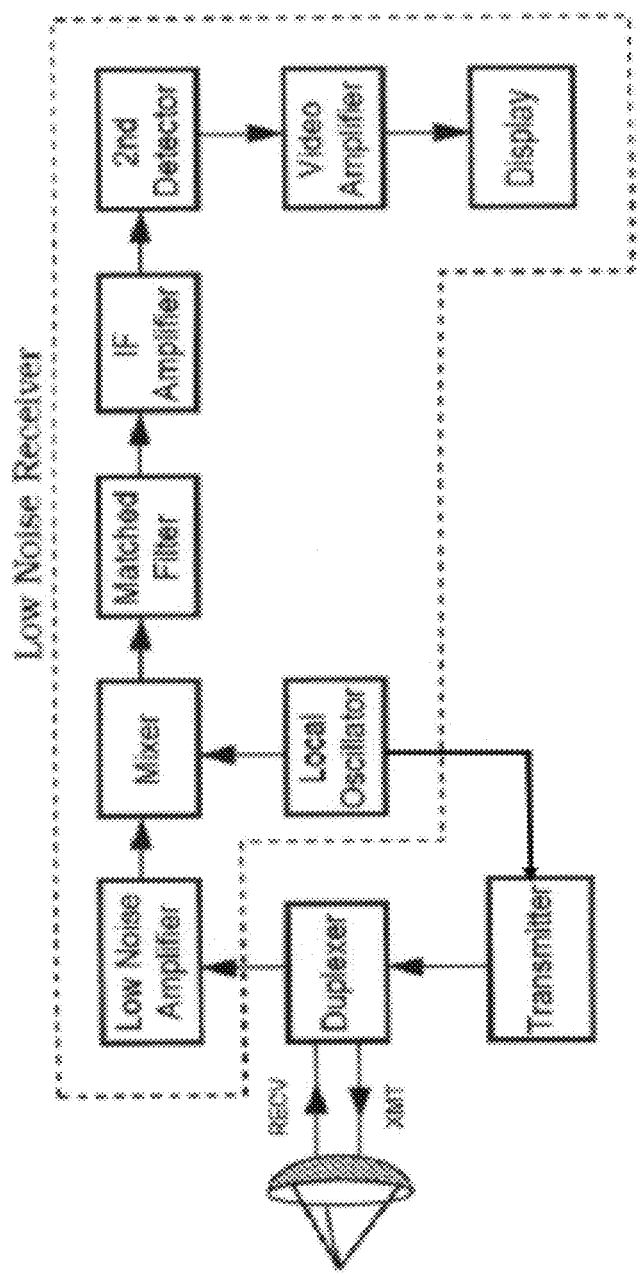
FIG. 13 is a schematic of an exemplary radar system, according to some embodiments.

FIG. 13 is a schematic of an exemplary radar system, according to some embodiments. Radar system comprises transmitter, duplexer, low noise amplifier, mixer, local oscillator, matched filter, IF filter, $2^{nd}$ detector, video amplifier and display.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

In this respect, various inventive concepts may be embodied as a computer readable storage medium (or multiple computer readable storage media) (e.g., a computer memory, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The invention claimed is:

1. A method, comprising:
   collecting radar signals reflected from objects in a field of view;
   forming a three-dimensional range-angle-velocity cube from the radar signals, the three-dimensional range-angle-velocity cube including individual bins with radar intensity values characterizing angle and range for a specific velocity;
   selecting point-pillar sub-cubes from the three-dimensional range-angle-velocity cube, each point-pillar sub-cube including a region surrounding a high energy peak in range-angle dimensions and an entire range in a velocity vector; and
   processing the point-pillar sub-cubes to compress, decompress, detect, classify or track objects in the field of view including:
      compressing velocity data in the point-pillar sub-cubes using one or more of a neural network or a pointwise operator before applying a classifier; and
      reconstructing uncompressed velocity data in the point-pillar sub-cubes.

2. The method of claim 1, wherein the region is defined by having values within a specified percentage of the high energy peak.

3. The method of claim 1, wherein the region is defined by being within a threshold distance of the high energy peak.

4. The method of claim 1, wherein the compressing the velocity data uses the pointwise operator.

5. The method of claim 1, wherein the compressing the velocity data uses the neural network.

6. The method of claim 1, wherein the reconstructing uncompressed velocity data occurs after classification in a processing pipeline.

7. The method of claim 1 wherein the neural network is used to detect, classify or track objects in the field of view.

8. The method of claim 1, wherein a compressed representation of the point-pillar sub-cubes are transmitted to another processing facility where classification is performed.

9. A radar system, comprising:
   a transmitter configured to transmit radar signals;
   a receiver configured to receive radar signals reflected from objects in a field of view;
   a signal processor configured to:
      form a three-dimensional range-angle-velocity cube from the received radar signals, the three-dimensional range-angle-velocity cube including individual bins with radar intensity values characterizing angle and range for a specific velocity;
      select point-pillar sub-cubes from the three-dimensional range-angle-velocity cube, each point-pillar sub-cube including a region surrounding a high energy peak in range-angle dimensions and an entire range in a velocity vector; and process the point-pillar sub-cubes to compress, decompress, detect, classify or track objects in the field of view including:
compressing velocity data in the point-pillar sub-cubes using one or more of a neural network or a pointwise operator before applying a classifier; and
reconstructing uncompressed velocity data in the point-pillar sub-cubes.

10. The radar system of claim 9, wherein the region is defined by having values within a specified percentage of the high energy peak.

11. The radar system of claim 9, wherein the region is defined by being within a threshold distance of the high energy peak.

12. The radar system of claim 9, wherein the compressing the velocity data uses the pointwise operator.

13. The radar system of claim 9, wherein the compressing the velocity data uses the neural network.

14. The radar system of claim 9, wherein the signal processor utilizes the neural network to detect, classify or track objects in the field of view.

15. The radar system of claim 9, wherein the transmitter is configured to transmit frequency modulated continuous wave (FMCW) signals.

16. The radar system of claim 9, further comprising a duplexer configured to isolate the transmitted and received radar signals.

17. The radar system of claim 9, wherein the signal processor is configured to trigger transmission of a compressed representation of the point-pillar sub-cubes to another processing facility where classification is performed.

* * * * *